Oct. 28, 1952  A. J. MELLERT  2,615,675
FLUID FUSE
Filed Nov. 4, 1946
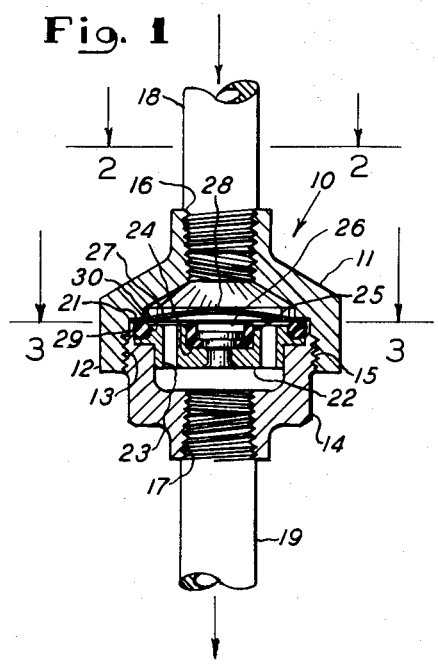
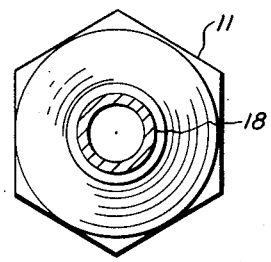
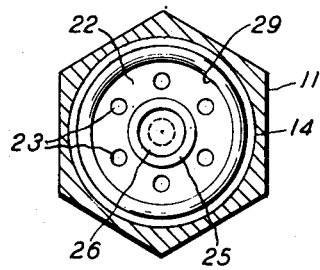
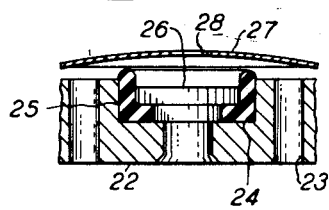
INVENTOR:
Allen J. Mellert,
BY Oldham & Oldham
Attorneys Patented Oct. 28, 1952

2,615,675

UNITED STATES PATENT OFFICE 2,615,675

FLUID FUSE

Allen J. Mellert, Euclid, Ohio, assignor, by mesne assignments, to The Carpenter Manufacturing Corporation, Cleveland, Ohio, a corporation of Ohio Application November 4, 1946, Serial No. 707,586

4 Claims. (Cl. 251—119)

This invention relates to fuses and especially to fuses for the passage of fluids below a predetermined pressure therethrough.

In fluid or hydraulic fuses or valves, various types of means have been provided to seal the fluid conducting members from each other when pre-determined operating conditions arise. Some of such fuse or seal members are adapted to function automatically, while others are physically controlled by external means. In the automatic acting fuses for fluids or liquids, it always has been difficult to obtain a good shut-off, or seal action when the pressures being transmitted become excessive, or when other conditions arise which should function the fuse.

The general object of the present invention is to avoid the foregoing and other difficulties of and objections to known types of fluid fuses and to provide an improved fuse which is adapted to have rapid and effective automatic shut-off action when pre-determined load conditions are reached.

Another object of the invention is to mount a curved resilient diaphragm member in a fuse so that such diaphragm member is free of lateral restraints in moving from one extremity of its position to its other extremity, which action is dependent upon the pressure differentials on opposite sides of the diaphragm.

Another object of the invention is to provide a flexible sealing cup in association with a resilient metal diaphragm in a fluid fuse.

Another object of the invention is to provide an improved, inexpensive, easily manufactured, readily assembled fuse for gases or liquids.

Another object of the invention is to provide a fluid fuse which can repeatedly move from fluid transmitting to fluid shut-off position, and back to transmitting position automatically as pre-determined load conditions arise.

The foregoing, and other objects and advantages of the invention which will be made apparent as the specification proceeds, are achieved by use of the structure shown on the accompanying drawings, wherein:

Fig. 1 is a longitudinal section through a fuse embodying the principles of my invention;

Fig. 2 is a section taken on line 2—2 of Fig. 1;

Fig. 3 is a transverse section taken on line 3—3 of Fig. 1; and

Fig. 4 is an enlarged fragmentary section of the diaphragm and associated means.

Now referring in detail to the structure shown on the drawings, an improved fuse 10 is provided which includes a tubular valve body section 11 which has an enlarged end portion 12 that is tapped at the end of its bore at 13. The valve body section 11 is adapted to engage with a second valve body section 14 which is threaded on its periphery at 15 and is adapted to engage with the section 11 to form a valve chamber. Both the valve body sections 11 and 14 are provided with reduced diameter end portions that are tapped at 16 and 17, respectively, or are otherwise formed, so as to engage with conduits 18 and 19, respectively. The conduit 18 may be formed of any desired material and may be flexible or rigid, as desired, and is adapted to connect to a source of fluid under pressure, whereas the conduit 19 is adapted to transmit such fluid to a desired point. An important feature of the fuse of the invention is that it is constructed and arranged so as to prevent transmittal of fluid therethrough should the pressure on same be greater than that desired in the conduit 19, or should the pressure differential on opposite sides of the diaphragm be greater than that desired in the system being controlled.

The tubular valve body section 11 is provided with a shoulder 21 on its inner surface which is axially aligned with the end of the valve body section 14 which carries a valve plate 22 on its end portion. The valve plate 22 is shown as being provided with a plurality of circumferentially spaced apertures 23 extending longitudinally therethrough, which apertures 23 are positioned in the valve plate remote from the central area thereof, and a substantially cylindrical recess 24 is provided in the end or surface of the valve plate 22 which is exposed towards the valve body section 11. Then as a primary feature of the fuse 10, the recess 24 receives in it a cup-shaped rubber sealing cup or member 25 which protrudes from the surface of the valve plate 22. In order to secure the rubber sealing cup 25 in position, a headed stud 26 extends through the cup 25, through a centrally positioned hole in the valve plate, and is peened over the adjacent surface of the plate 22, or is otherwise suitably engaged with the valve plate.

The actual shut-off member of the fuse of the invention comprises a resilient spring metal diaphragm 27 which is mounted in the fuse 10 between the shoulder 21 of the valve body section 11 and the end of the valve body section 14. This spring diaphragm 27 is adapted to arch or bridge over the valve plate 22 and be positioned remotely from the sealing cup 25 when the diaphragm is arched or bowed towards the conduit 18. However, should the pressure in the conduit 18 become larger than that predetermined force at which point the fuse is designed to shut off fluid flow, then the diaphragm 27 will be automatically flattened out to lie flush against the valve plate 22, or as nearly so as the diaphragm may move. In such a position the diaphragm 27 is tightly pressed against the edges of the sealing cup 25 so as to prevent liquid or fluid flow between such sealing cup and the diaphragm. Ordinarily, fluid flows from the conduit 18 through a central aperture 28 in the diaphragm and then through the apertures 23 in the valve plate 22 to the conduit 19, but when the diaphragm 27 is flattened such flow is prevented. The edges of the rubber sealing cup 25 protrude beyond the plate 22 a sufficient distance that they will engage with the diaphragm 27 to form a seal therewith even though slight irregularities exist in the diaphragm's surface.

Another feature of the invention, and one which facilitates flexure of the spring diaphragm 27, is that the diaphragm is mounted at its edge on an O-ring 29 that is carried by the valve plate 22 at its periphery and retained in such position by being seated in a recess 30, formed at the periphery of the valve plate. The recess 30 is of a size to permit limited rolling movement of the O-ring 29. This ring 29 is made from a member which is substantially circular in section, as shown in the drawing, and it may be made from rubber or any rubber-like material. Thus engagement of the valve body sections 11 and 14 will serve to press the edges of the spring diaphragm 27 between the shoulder 21, formed on the valve section 11, and the rubber ring 29 that is carried by the valve plate which, in turn, is mounted on the end of the valve body section 14. Thus, fluid leakage around the edges of the diaphragm is prevented by such a rubber ring, which will effectively flow into any crevices or leakage points that otherwise might exist between the peripheries of the valve plate and the valve body section 11.

From the foregoing, it will be seen that the present invention broadly comprises mounting a valve plate, having at least one aperture therein, in a valve and having a continuous, open-centered sealing member associated with said valve plate out of alignment with the aperture in the plate and projecting from the surface of the plate. Then, by mounting a resilient spring diaphragm at its edges in close association with the valve plate, and forming an aperture in the diaphragm which is axially aligned with the sealing member carried by the valve plate, one can seal such transmittal orifice in the resilient diaphragm when the diaphragm is flattened out against the valve plate. Or, in other words, I need not be limited to a centrally positioned aperture and sealing cup in my novel fuse since, in some instances, it may be desirable to provide such sealing arrangement at an eccentric portion of the valve.

Likewise the fuse of the invention can be used with vacuums, as well as other pressure differentials, and be adapted to shut when the differential, on opposite sides of the snap acting metal diaphragm is more than a predetermined amount.

By calculating the area of a diaphragm and knowing the desired operating pressures of a system, one can select the proper gage diaphragm to be used so that it will snap automatically from its open to its closed position, as the pressure differential on the diaphragm changes over the desired operating pressure for the diaphragm.

While it has been stated that the sealing cup is made from rubber, any synthetic rubber or rubber-like material may be used in forming this member, as desired.

In accordance with the Patent Statutes, one embodiment of the invention has been completely illustrated and described herein, but it will be understood that the invention is not limited thereto or thereby but that it is defined solely by the appended claims.

I claim:

1. In a fluid fuse, a resilient curved diaphragm constructed to snap from an open to a closed position and in so doing to change its arc of curvature, said diaphragm having a continuous arc of curvature extending over the complete diameter thereof and having a substantially centrally positioned aperture therein, a resilient O-ring supporting the edges of said diaphragm in a sealing position in the fuse, a member for engaging a center portion of said diaphragm to provide an open and a closed position for said diaphragm, said member engaging said diaphragm and surrounding the aperture therein to provide a closed diaphragm position, said O-ring being made of a band of material of circular shape in cross section and being free in the fuse for limited rolling movement to facilitate movement of said diaphragm from open to closed position, and means for pressing said diaphragm against said O-ring to seal the edges of said diaphragm but leave same free for limited transverse movement as occurs when changing the arc of curvature of the diaphragm.

2. In a fluid fuse, a resilient curved diaphragm having a substantially centrally positioned aperture therein and constructed to snap from an open to a closed position, and a resilient O-ring made from a member of circular shape in section, said O-ring supporting the edges of said diaphragm and being in sealing engagement with same but leaving it free for expanding movement, the member forming said O-ring being rollably positioned in the fuse, and a member for engaging a center portion of said diaphragm to provide an open and a closed position for said diaphragm, said member engaging said diaphragm and surrounding the aperture therein to provide a closed diaphragm position.

3. In a fluid fuse, a combination of a valve plate having at least one eccentrically positioned aperture therein, a continuous open-centered rubber sealing member associated with said plate spaced from said aperture and projecting from the surface of said plate, a resilient curved snap acting spring metal diaphragm movably associated at its edges with said plate and adapted to lie substantially flush against or arched over said plate dependent upon the pressure exerted thereon, said diaphragm having a hole therein adapted to be surrounded by said sealing member when said diaphragm is pressed toward said plate and prevent fluid flow through the aperture in said diaphragm to the aperture in said plate, an O-ring associated with said plate, and means for pressing said diaphragm against said O-ring to seal same thereto but permit movement of said diaphragm from one position to another, said O-ring being made from rubber.

4. In a fluid valve, a tubular valve section adapted to engage with a source of fluid under pressure, a second tubular valve section adapted to engage with means for transmitting the fluid under pressure, said valve sections being engaged with each other to define a valve chamber, one of said sections having a shoulder formed in its bore, a valve plate having a plurality of circumferentially spaced apertures therein spaced radially from the center section thereof and having a recess in its center section, a rubber sealing cup, means securing said cup in the recess in said valve plate with its edges projecting beyond the surface of said valve plate, an annular rubber ring which is made of a member of circular cross-section and which is positioned on the shoulder formed on one of said valve sections, said ring being compressed between said valve sections, and a centrally apertured snap acting dished resilient disc positioned on said rubber ring and secured between it and the other of said valve sections whereby fluid will flow through the valve by flowing through the apertures in said disc and valve plate when said disc is arched thereover, said disc being constructed to be flattened down against said valve plate and the edges of said rubber cup when greater pressure exists on the convex side of said disc, the edges of said disc being spaced from the inner surfaces of the said valve section in which it is positioned to be free for limited transverse movement with change in the curvature of said disc.

ALLEN J. MELLERT.

REFERENCES CITED

The following references are of record in the file of this patent:

UNITED STATES PATENTS

| Number | Name | Date |
|---|---|---|
| 213,118 | Locke | Mar. 11, 1879 |
| 266,462 | Gordon | Oct. 24, 1882 |
| 1,038,527 | Coleman | Sept. 17, 1912 |
| 1,190,654 | Kammerhoff | July 11, 1916 |
| 1,897,155 | Vaughn | Feb. 14, 1933 |
| 2,006,319 | Hueber | June 25, 1935 |
| 2,117,389 | Yoder | May 17, 1938 |
| 2,236,253 | Testori | Mar. 25, 1941 |
| 2,344,657 | Thiel | Mar. 21, 1944 |
| 2,376,402 | Svirsky | May 22, 1945 |
| 2,417,494 | Hoff | Mar. 18, 1947 |
| 2,481,460 | Williams | Sept. 6, 1949 |

FOREIGN PATENTS

| Number | Country | Date |
|---|---|---|
| 289,201 | Italy | of 1931 |